US009697452B2

(12) United States Patent
Itay et al.

(10) Patent No.: US 9,697,452 B2
(45) Date of Patent: Jul. 4, 2017

(54) ADAPTER FOR PERSONAL ELECTRONIC DEVICES AND METHODS OF USE THEREOF

(71) Applicant: On Track Innovations Ltd., Rosh Pina (IL)

(72) Inventors: Nehemya Itay, Beit Hillel (IL); Nir Gazit, D.N. Misgav (IL); Yaacov Haroosh, Migdal HaEmek (IL)

(73) Assignee: On Track Innovations Ltd., Rosh Pina (IL)

( * ) Notice: Subject to any disclaimer, the term of this patent is extended or adjusted under 35 U.S.C. 154(b) by 0 days.

(21) Appl. No.: 13/827,561

(22) Filed: Mar. 14, 2013

(65) Prior Publication Data

US 2014/0027519 A1    Jan. 30, 2014

Related U.S. Application Data

(60) Provisional application No. 61/674,938, filed on Jul. 24, 2012, provisional application No. 61/694,801, filed on Aug. 30, 2012.

(51) Int. Cl.
*G06K 19/07* (2006.01)
*G06K 19/077* (2006.01)
(Continued)

(52) U.S. Cl.
CPC ..... *G06K 19/0727* (2013.01); *G06K 7/10009* (2013.01); *G06K 7/10237* (2013.01);
(Continued)

(58) Field of Classification Search
CPC .... G06Q 20/32; G06Q 20/322; G06K 7/0004; G06K 7/082; G06K 7/00; G06K 19/0727;
(Continued)

(56) References Cited

U.S. PATENT DOCUMENTS 6,161,762 A    12/2000 Bashan et al.
8,336,771 B2    12/2012 Tsai et al.
(Continued)

FOREIGN PATENT DOCUMENTS

CN    101645129    2/2010
CN    101770598    7/2010
(Continued)

OTHER PUBLICATIONS

Search Report of International Application No. PCT/IL2013/050293 mailed on Aug. 9, 2013.
(Continued)

*Primary Examiner* — Sonji Johnson
(74) *Attorney, Agent, or Firm* — Pearl Cohen Zedek Latzer Baratz LLP

(57) ABSTRACT

An adapter and methods of using the adapter for communicating a personal electronic device to a smart card reader are disclosed. The adapter comprises a processor, a contact/contactless smartcard chip, an antenna and a power supply unit. The processor is adapted to exchange data with the personal electronic device, wherein that data is modulated on the audio signals. The processor is also adapted to exchange data with the smartcard chip, wherein the smartcard chip is adapted to communicate with the contactless smart card reader via the antenna. A method for enabling a personal electronic device to communicate with a contactless smart card reader via audio signals is also disclosed. The method comprises providing an adapter. The adapter comprises a processor, a contact/contactless smartcard chip, an antenna and a power supply unit. The method also comprises exchanging data between the personal electronic device and the processor.

28 Claims, 15 Drawing Sheets

(51) Int. Cl.
*G06K 7/10* (2006.01)
*H04M 1/725* (2006.01)

(52) U.S. Cl.
CPC ... *G06K 7/10297* (2013.01); *G06K 19/07741* (2013.01); *H04M 1/72527* (2013.01)

(58) Field of Classification Search
CPC .......... G06K 7/10297; G06K 7/10009; G06K 7/10237; G06K 19/07741; H04M 1/72527
USPC ....................................... 235/380, 439, 440
See application file for complete search history.

(56) References Cited

U.S. PATENT DOCUMENTS

| | | |
|---|---|---|
| 2004/0058649 A1 | 3/2004 | Grady |
| 2007/0155430 A1 | 7/2007 | Cheon et al. |
| 2008/0048042 A1* | 2/2008 | Degauque et al. ........... 235/492 |
| 2008/0128505 A1 | 6/2008 | Challa et al. |
| 2009/0251291 A1* | 10/2009 | Borcherding ................ 340/10.1 |
| 2010/0259216 A1 | 10/2010 | Capomaggio |
| 2011/0212687 A1 | 9/2011 | Foster |
| 2011/0259957 A1 | 10/2011 | Tsai |
| 2011/0309154 A1 | 12/2011 | Englebardt |
| 2011/0312270 A1 | 12/2011 | White |
| 2011/0312382 A1 | 12/2011 | Itay et al. |
| 2012/0293001 A1* | 11/2012 | Chan et al. ..................... 307/66 |
| 2013/0087614 A1* | 4/2013 | Limtao et al. ................ 235/449 |
| 2013/0095754 A1* | 4/2013 | Moreton et al. ............. 455/41.1 |
| 2013/0095755 A1 | 4/2013 | Moreton et al. |
| 2013/0234658 A1 | 9/2013 | Endo et al. |
| 2014/0019340 A1 | 1/2014 | Ruder et al. |
| 2014/0027519 A1 | 1/2014 | Itay et al. |
| 2014/0131442 A1 | 5/2014 | Morrow et al. |
| 2014/0203082 A1* | 7/2014 | Huh .............................. 235/440 |

FOREIGN PATENT DOCUMENTS

| | | |
|---|---|---|
| CN | 101833678 | 9/2010 |
| CN | 102523092 | 6/2012 |
| JP | 2006-268410 | 10/2006 |
| WO | WO 2012/049564 | 4/2012 |

OTHER PUBLICATIONS

International Search Report and Written Opinion for PCT International Application No. PCT/IL15/50053 mailed Jun. 9, 2015.
Office Action from U.S. Appl. No. 14/162,245 issued Mar. 27, 2015.
Office Action issued by the United States Patent and Trademark Office for U.S. Appl. No. 14/162,245 dated Oct. 8, 2015.
Notice of Allowance issued by the United States Patent and Trademark Office for U.S. Appl. No. 14/162,245 dated Mar. 3, 2016.
Office Action issued by The State Intellectual Property Office of China for Chinese Application No. 2013800489596 dated Nov. 1, 2016.

* cited by examiner

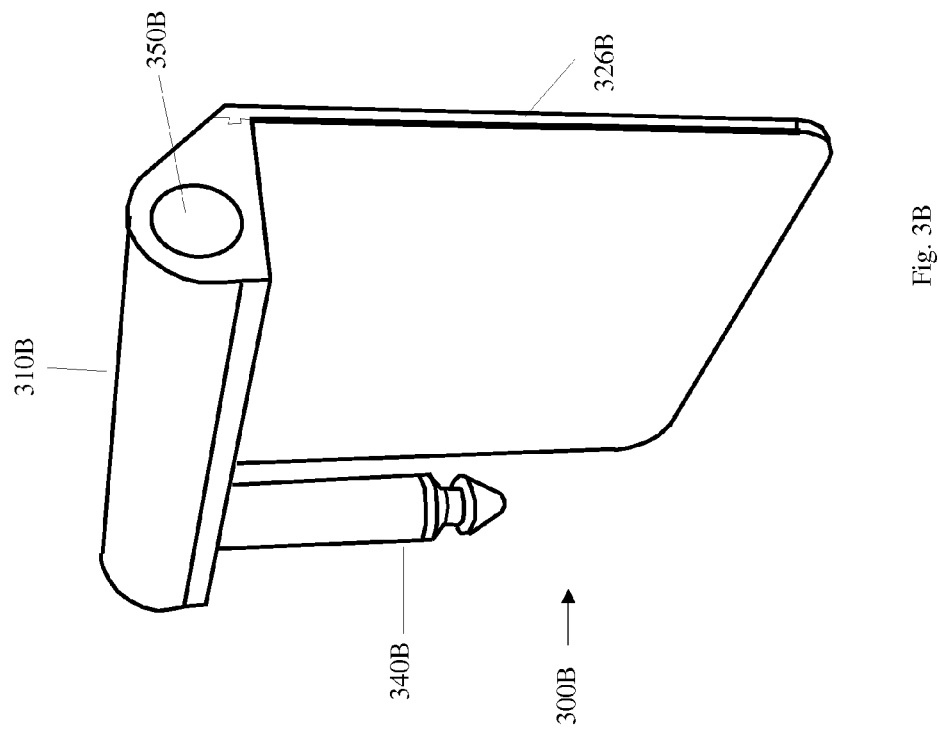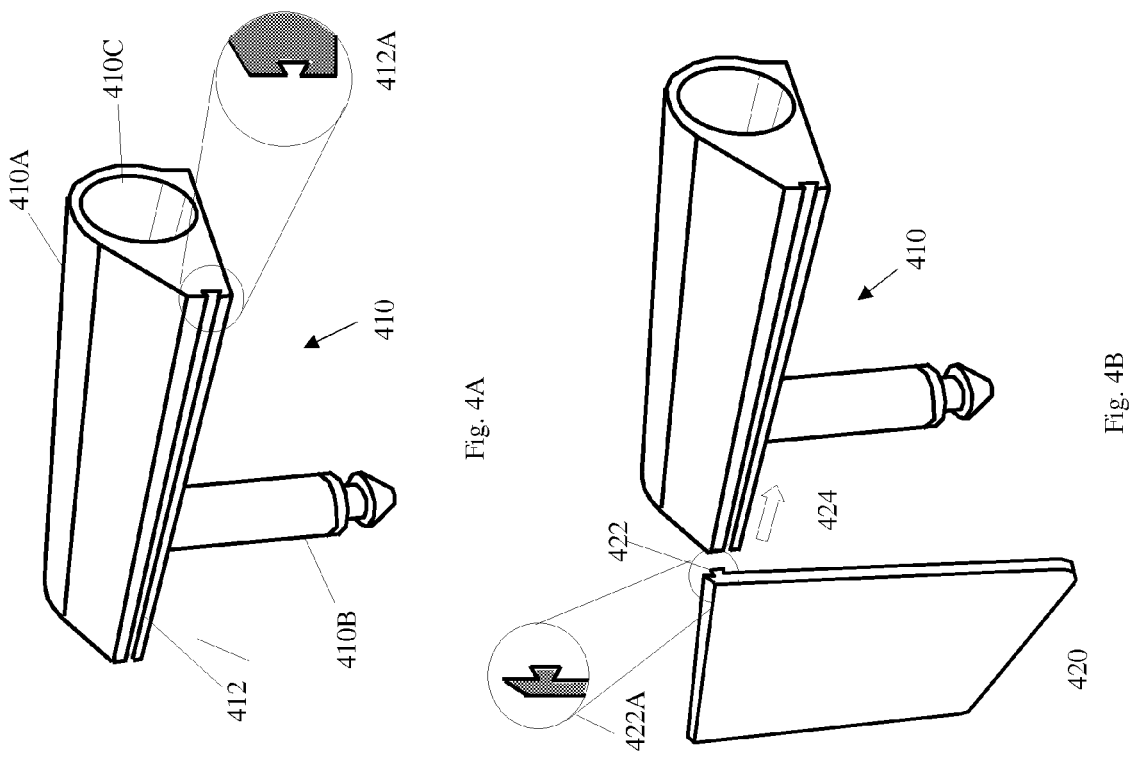

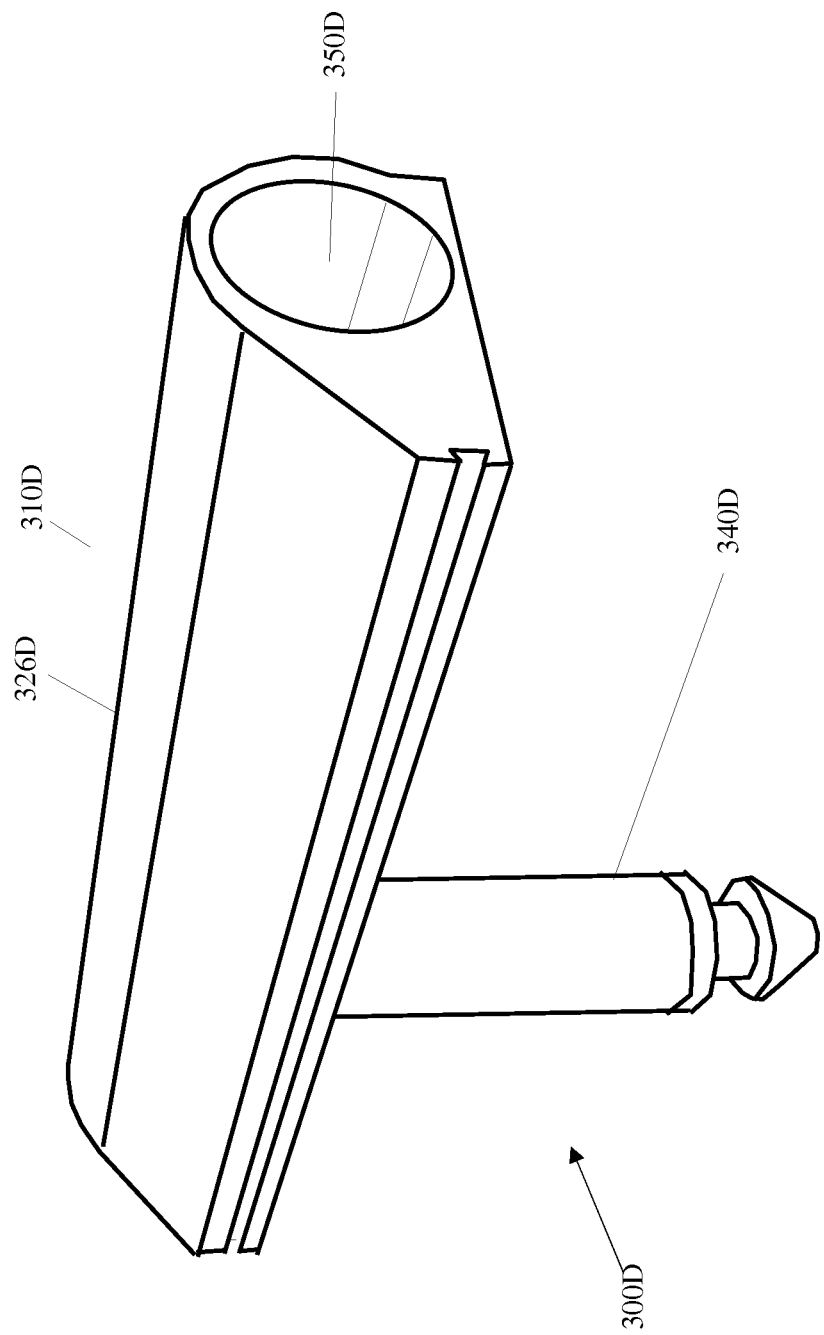

ADAPTER FOR PERSONAL ELECTRONIC DEVICES AND METHODS OF USE THEREOF

CROSS REFERENCE TO RELATED APPLICATIONS

This application claims the benefit of U.S. Ser. No. 61/674,938, filed on Jul. 24, 2012 and entitled ADAPTER FOR PERSONAL ELECTRONIC DEVICES AND METHODS OF USE THEREOF, and U.S. Ser. No. 61/694,801, filed on Aug. 30, 2012 and entitled ADAPTER FOR PERSONAL ELECTRONIC DEVICES AND METHODS OF USE THEREOF, all of which are incorporated in their entirety herein by reference.

BACKGROUND OF THE INVENTION

Smartphones and other personal electronic devices such as tablet computers may incorporate contactless communication capabilities (e.g. Proximity or Near Field Communication (NFC)). Such capabilities, which allow contactless communication with a compatible reader to transmit and receive data, for example, during a payment transaction, can be embedded in the personal electronic device or can be added by an adapter that connects to the personal electronic device. Prior art solutions including the Contactless Payment and NFC Solution for Mobile Devices (COPNI), manufactured and sold by On Track Innovations Ltd. (OTI), connect to the personal electronic device through a contact and contactless data communication capabilities and standard subscriber identification module (SIM) capabilities smart chip, such as the SmartMX P5CD080 of NXP Semiconductors N.V., as described in US patent application publication no. 2011/0312382 to OTI. In this solution an NFC antenna is connected to the contactless pins of the smart chip and the smart chip communicates with the smartphone via the contact communication pins.

SUMMARY OF THE INVENTION

According to embodiments of the present invention an adapter is disclosed allowing contactless communication such as Proximity and/or NFC with personal electronic devices, such as smart phones or tablet computers, via the headset socket of the electronic device, utilizing the speakers and microphone lines, while enabling an accessory, such as a headset or earphone and microphone set, to be connected to the personal electronic device via an alternative socket located on the adapter.

An adapter for enabling a personal electronic device, via audio signals, to communicate with a contactless smart card reader is disclosed, the adapter comprising, a processor, a contact/contactless smartcard chip, an antenna and a power supply unit, wherein said processor is adapted or configured to exchange first data with said personal electronic device, wherein said first data is modulated on said audio signals and to exchange second data with said smartcard chip, said smartcard chip to communicate with said contactless smart card reader via said antenna.

According to some embodiments of the present invention one of the speaker lines at the headset socket may be used to provide electrical energy for operating the adapter.

A method for enabling a personal electronic device to communicate with a contactless smart card reader via audio signals is disclosed, the method comprising providing an adapter, the adapter comprising a processor, a contact/contactless smartcard chip, an antenna and a power supply unit, exchanging first data between said personal electronic device and said processor, wherein said first data is modulated on said audio signals; and exchanging second data with said smartcard chip, said smartcard chip to communicate with said contactless smart card reader via said antenna.

According to some embodiments of the present invention data received during contactless communication session, e.g. with a contactless reader equipment, such as data of performed monetary transaction, may be presented on the screen of the personal electronic device. Additionally, details of the card chip may also be presented.

According to some embodiments of the present invention data entered by a user of the personal electronic device may effect and control the operation of the adapter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A, 3B, 3C, 3D, 3E and 3F are schematic illustrations of physical designs of adapters according to embodiments of the present invention;

FIG. 4A, which schematically illustrates adapter main body according to embodiments of the present invention;

FIGS. 4B and 4C are illustrations of detachable antenna designs adapted according to embodiments of the present;

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Typical contactless smart card may comprise electronic circuitry, comprising active units, such as controller/microprocessor and passive elements, such as NFC antenna. Some electronic circuitry for contactless smart cards may be able to operate in two modes: contact mode and contactless mode. In contactless mode the electronic circuitry may be powered by RF energy received at the antenna of the device.

Figure 1:
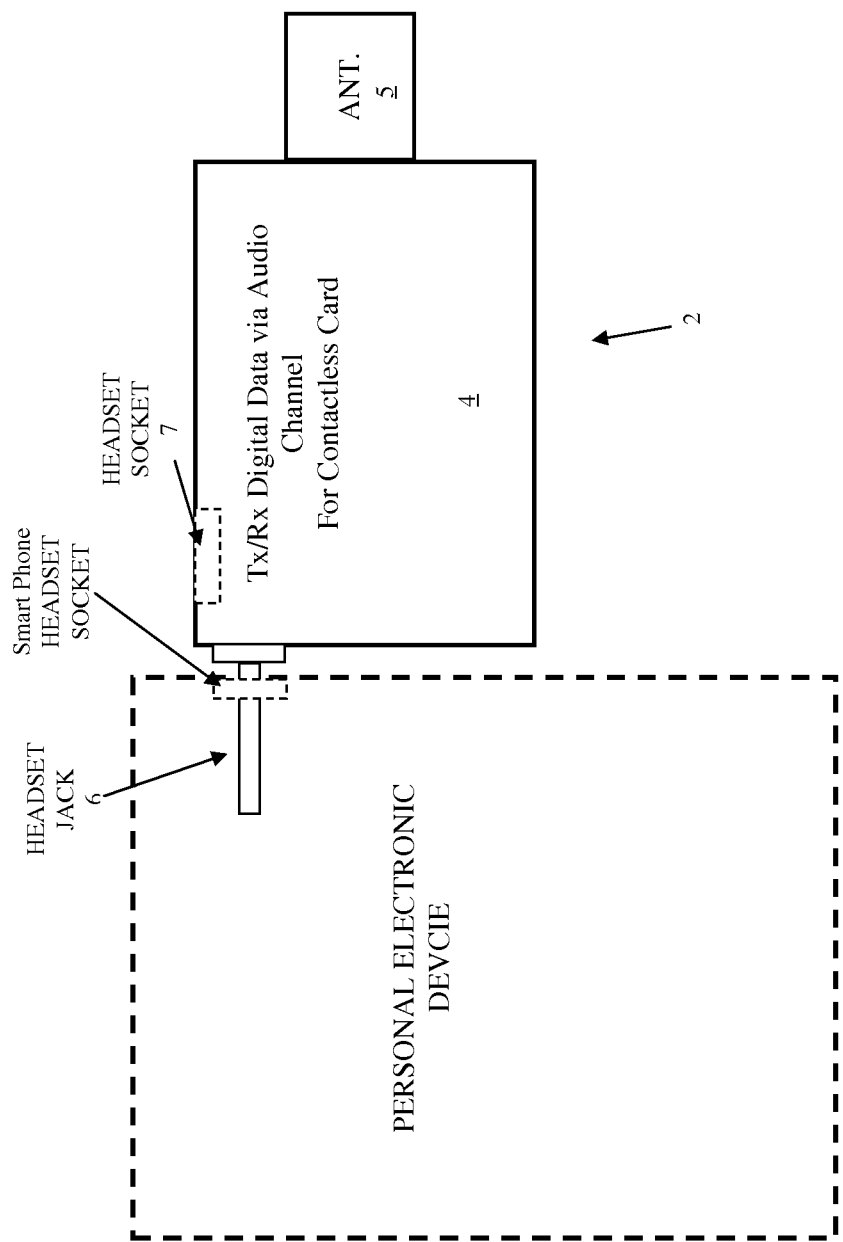
FIG. 1 is a schematic high-level block diagram of an adapter according to embodiments of the present invention.

Reference is made to FIG. 1 which is a schematic high-level block diagram of an adapter 2 according to embodiments of the present invention. Adapter 2 may comprise electronic circuitry 4, RF antenna 5, headset stereo jack 6 and headset socket 7. Electronic circuitry 4 may be adapted to operate as a contactless smartcard unit, capable of receiving and transmitting RF signals via antenna 5 using any desired protocol, such as the protocol of ISO/IEC 14443 standard for Contactless Integrated Circuit Cards-Proximity Cards. Electronic circuitry 4 may be connected, via headset jack 6, to a personal electronic device such as a smartphone, having a headset socket. Adapter 2 may receive from the personal electronic device, via headset jack 6, audio signals received over dedicated channels such as audio signals for right speaker (RS) and for left speaker (LS). Adapter 2 may transmit to the personal electronic device, via headset jack 6, audio signals sent over a dedicated channel such as microphone input (MIC).

Figure 2A:
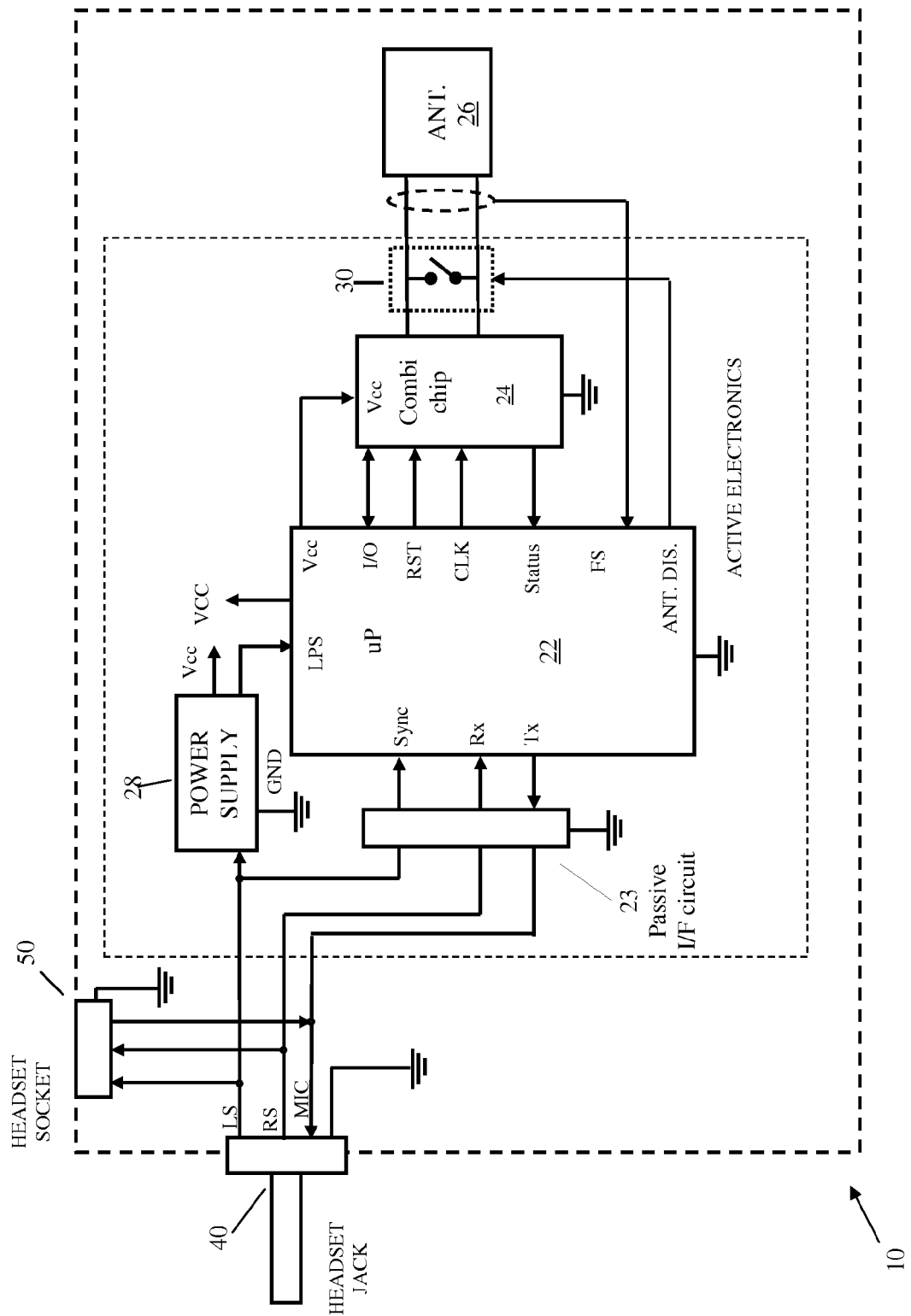
FIG. 2A is a schematic block diagram of an adapter according to embodiments of the present invention.

Reference is made now to FIG. 2A, which is a schematic block diagram of an adapter 10 according to embodiments of the present invention. Adapter 10 may comprise processor unit 22, contact/contactless smartcard chip 24 (sometimes called combi chip), RF antenna 26, power supply unit 28, passive interface circuit 23, headset jack 40 and headset socket 50. Processor unit 22 may be any suitable processor, microprocessor (uP), controller, microcontroller and the like. Combi chip 24 may be any chip adapted or configured to provide and support contactless communication via antenna, such as antenna 26 and contact communication via dedicated pins on it. RF antenna 26 may be any suitable antenna complying with contactless requirements, such as according to ISO 14443 standard. According to some embodiments chip 24 may comprise Smart Card functionality. Processor 22 may be configured or adapted to carry out methods according to the present invention, for example by executing software.

Headset jack 40 may be any standard stereo headset jack such as the 3.5 mm stereo jack supporting two audio channels out—LS and RS and one audio channel in—MIC.

Audio channel out RS and audio channel in MIC may form a two way channel for uP 22, via passive interface 23, to communicate with any personal electronic device connected to headset jack 40 over an audio channel. Audio channel out LS may be used to provide energy for the operation of adapter 10. Audio channel LS may also be routed to uP 22 to provide synchronizing (sync) signal for the communication. The power required for the operation of adapter 10 may be delivered to power supply unit 28 via audio channel LS in the form of a specific audio signal, hereinafter denoted powering audio signal. The powering signal may be in a defined frequency or a range of frequencies and it may have defined amplitude or it may be in a defined range of amplitudes. According to some embodiments audio channel RS may be used, also, for providing additional powering to adapter 10 hence increasing the available power supply for adapter 10, as is explained and described in details with respect to FIG. 2B hereinafter. In such case the data and power signals may be combined in suitable way over RS channel. Power supply unit 28 may boost, rectify and regulate the powering signal received over audio channel LS, and optionally also via RS channel, to provide the required power for the operation of adapter 10 between power terminals Vcc and GND. According to some embodiments of the present invention when audio signal received from audio channel LS, and optionally channel RS, is not within the defined frequency and/or level limitations, power supply unit 28 will not activate adapter 10 and/or uP 22 will be in off mode. Audio powering signal may be initiated and provided by the personal electronic device, for example, by the execution of a dedicated program stored and running on the personal electronic device, and may be provided to adapter 10 via the audio out socket of the personal electronic device to which headset jack 40 may be attached or plugged. According to some embodiments the powering audio signal may differ in its frequency range and/or in its amplitude range from the frequency range and/or the amplitude range, respectively, of the typical audio signal provided by the personal electronic device during normal operation of the headset.

Passive interface circuit 23 may comprise, for example, resistors and capacitors (not shown), and may be used to mutually adapt and match the amplitudes and DC levels of the signals exchanged between uP 22 and a personal electronic device to which adapter 10 is connected via its earphone headset socket.

uP 22 may be adapted or configured to communicate with the personal electronic device by the receiving of audio signals modulated with digital data and/or instructions and by extracting the digital data from the audio modulated signal received on audio channel RS. uP 22 may be further adapted to modulate audio signal with data and send it over audio in channel MIC to the personal electronic device. uP 22 may be adapted to use the powering signal over channel LS as a synchronization signal for its communication with the personal electronic device.

uP 22 may further be adapted to communicate with combi chip 24 via pins on both uP 22 and combi chip 24, utilizing bi-directional input/output (I/O) data channel with combi chip 24, providing power (Vcc), clock (CLK) and reset (RST) signals to combi chip and receiving status signal from combi chip 24 thus enabling ON/OPP control in contact mode of combi chip 24 from uP 22. The two way input/output (I/O) channel allows sending and receiving data and/or instructions between uP 22 and combi chip 24.

Combi chip 24 may be a standard dual mode contact/contactless smart card IC chip, adapted to support communication in both modes, such as P5CD080 of NXP Semiconductors N.V. Combi chip 24 may be of a kind that does not allow concurrent communication in contact and in contactless modes. In such embodiments a mechanism is provided to control and guarantee proper switching between the modes of operation of combi chip 24, as is explained in details herein below.

In order to control and coordinate the operation of combi chip 24 in its contact/contactless modes of operation an antenna control unit 30 may be provided, connected between combi chip 24 and RF antenna 26 and adapted to enable/disable the flow of RF signals between RF antenna 26 and combi chip 24. According some embodiments of the present invention control unit 30 may prevent RF signals picked by antenna 26 from reaching combi chip 24 by, for example, shorting of the RF signals picked up by antenna 26. Antenna control unit 30 may be controlled by signal, such as signal ANT DIS, provided by uP 22. Antenna control unit 30 may be embodied in any known way and preferably by using electronic switches (diodes, transistors, or any other controllable semiconductor shorting means). Coordination mechanism for the modes of operation of combi chip 24 may further comprise field sense (FS) signal produced by RF antenna 26 and provided to uP 22. FS signal may be, for example, 'true' only when an RF signal of high enough level is sensed by RF antenna 26. According to an embodiment of the present invention signal FS may be provided when RF field is sensed regardless of the status of switch 30.

With combi chip 24 which supports concurrent activation of both contact and contactless modes of operation, field sense signal may alternatively be manifested by using the uP 22 Vcc pad as an input, sensing the voltage level at Vcc pad of combi chip 24, or by sensing the voltage level at the status pad of combi chip 24 (require software support in combi chip 24).

When no power is supplied to adapter 10, either via the headset jack 40 in the form of a powering audio signal or via RF antenna 26 in the form of RF signals, adapter 10 is in 'off' state. Power supply to adapter 10 and communication with it may be initiated by either a user of the personal electronic device invoking a program that initiates provision of a powering audio signal which supplies power to adapter 10, enabling two-way communication between the personal electronic device and uP 22 and, via uP 22, enabling combi chip 24 to communicate in contact mode, or by exposing the adapter to an RF field of an external contactless smart card reader sensed by RF antenna 26, enabling adapter 10 to perform contactless communication session. It will be noted that for contactless mode communication with combi chip 24 no power from power supply unit 28 is required and all the power that is needed may be provided from the RF energy of the received RF signal, as is known in the art.

Adapter 10 may be in one of several modes of operation, dictated mainly by the combination of power sources provided to adapter 10 from a received RF signal and from a personal electronic device connected to adapter 10 via headset jack 40, and by the timing of their appearance/disappearance with respect to each other. When adapter 10 is in 'off' state (and as a result combi chip 24 is in off state) and communication in contact mode is first to be initiated, uP 22 may wake up/resume operation and issue ANT DIS signal which may prevent subsequent RF signal received by RF antenna 26 from reaching to combi chip 24, for example by shorting this RF signal. This may be performed, for example, by controllable switch 30 which is normally open and when it receives signal ANT DIS it closes and shorts the antenna terminals. This is done to avoid attempts to concurrently activate combi chip 24 in both contact and contactless modes. This functionality is especially important for combi chips which do not support concurrent activation of both contact and contactless modes of operation. The operation of adapter 10 in this contact mode may continue as required. When this contact mode session ends, uP 22 may turn signal ANT DIS off thus removing the short over RF antenna 26 terminals, enabling subsequent contactless operation in the presence of RF field. In this case FS signal turns TRUE, which in turn may cause uP 22 to wait with any further contact communication sessions until FS signal becomes FALSE again, indicating the removal of the RF field, or the removal of the adapter along with the personal electronic device it is connected to away from the RF field. Alternatively uP 22 may elect to force activation of unit 30 while FS is still true so as to force ending of the contactless operation in order to allow contact operation. In case where combi chip 24 can support concurrent contact-contactless operation, unit 30 may not be required. These manners of switching back and forth between contact and contactless modes of operation, may be for example part of a multi stage operation in which a contactless mode has been initiated in order to, for example, perform a money transaction, and a user input is required as part of the scenario of operation. In such typical event, when the user's input is required, adapter 10 may be taken out of the RF field thus enabling switching to contact mode and the switch to contact mode may enable the entry of user's input to be transferred to combi chip 24. According to this example, once the user finished entering the input the adapter may be brought closer to the contactless smart card reader thus causing an RF field to be sensed by antenna 26 enabling initiation of contactless mode session. According to another embodiment the contact mode session may terminate, for example, by the termination of the powering audio signal, for example due to a respective command issued by the program that activated that mode.

Activation of the adapter and communication in contact mode as a result of input from the user of the personal electronic device may be enabled by a program running on the personal electronic device which may cause the audio output unit of the personal electronic device to transmit a powering audio signal via LS output channel, This signal may provide energy to power supply unit 28, that is enough for providing operating power Vcc to uP and thus to wake it up and subsequently to power also the Combi chip. In some cases there may be a need to save the power provided by the personal electronic device. According to some embodiments of the present invention power provided by the powering audio signal may be less than required for full operation of adapter 10. In such cases the powering audio signal status may be indicated to uP 22 which, in turn, may prevent powering of combi chip 24, thus limiting power consumption of adapter 10. In order to support this feature power supply 28 may include an available power metering circuitry (not shown) which signals uP 22 by signal LPS (low power signal) and thus enabling uP 22 to judge the available power level and manage accordingly the operation of other units, such as combi chip 24. LPS signal may have a discrete value such as high/low value. According to another embodiment a digital duty cycle controlled signal issued by power supply unit 28 can be used to indicate status of more than just two levels. and be connected to a logical input in uP 22, or, according to some embodiments of the present invention, LPS signal may be an analog signal or a multi-level signal and may be connected to a respective input port at uP 22, allowing uP 22 to judge the available power more accurately. According to some embodiments uP 22 may invoke a dialogue with the user of the personal electronic device to which adapter 10 is connected, advising him/her to enable support of more power to adapter 10 by, for example, disconnecting the headset from headset socket 50. According to yet other embodiments uP 22 may signal the personal electronic device to provide more power by, for example raising or lowering the frequency of the powering audio signal so as to improve the AC to DC conversion efficiency of power supply unit 28.

Communication in this contact mode enables transfer of data between combi chip 24 and uP 22, such as data associated with transaction that was carried out previously in contactless mode, and transfer data between uP 22 and the personal electronic device via audio channels RS and MIC. Such data from the Combi chip, or portion of it, may be presented to the user of the personal electronic device. If response or input from the user is required for the operation of adapter 10, or for the transaction performed by it, this data may be exchanged between the personal electronic device and uP 22 via RS and MIC channels and then provided to combi chip 24. The types of data that may be exchanged between adapter 10 and the personal electronic device are data indicative of the performed operation/transaction by adapter 10, such as paid sum, details of purchased items, etc. Once this data exchange is finished and antenna disable signal ANT DIS is deactivated, uP 22 may check the status of the FS signal and if "false" may report it back to personal electronic device which may return adapter 10 to off state until further initiation of power and communication.

Operation of adapter 10 in contact mode is possible, according to an embodiment of the present invention, only as long as no headset is connected to it via headset socket 50. Once a headset is connected to adapter 10 it may prevent audio channel LS from providing enough energy to power supply unit 28 and as result—prevent operation of uP 22. Additionally the activation signal at channel LS may interfere with the normal use of the headset. In another embodiment powering audio signal may be in a frequency that does not interfere with audio communication between the personal electronic device and the headset connected to headset socket 50, for example the use of higher frequency, above the human hearing frequency range.

When adapter 10 is in 'off' state and RF signals are received in RF antenna 26 before power is supplied by power supply unit 28, adapter 10 switches to contactless mode of operation, and as a result signal FS becomes 'true'. At this state if uP 22 will be activated in response to initiation from, for example, the user of the personal electronic device, the presence of signal FS will signal uP 22 to avoid any attempt to switch adapter 10 into contact communication mode. As long as switch 30 is open, and is not intentionally closed by uP 22, the RF signal received from RF antenna 26 is presented to combi chip 24, energizes it and the communication in contactless mode proceeds as is known in the art. Once a communication in contactless mode terminates, adapter 10 may return to 'off' state until further initiation of communication. When adapter 10 is in contactless communication mode no contact communication in adapter 10 between uP 22 and combi chip 24 may be performed. In embodiments where the combi chip in use allows concurrent communication, both in contact mode and in contactless mode, the above limitation may not be necessary or be applied. As described above a typical use of adapter 10 may include several segments along the time axis in which after contactless session has been established and a transaction that takes place during the contactless session requires an input from the user, the contactless mode may terminate in order to enable establishing of contact mode communication, and after the data transaction in contact mode ends, terminating the contact mode session to enable reactivating of a contactless mode to enable conveying, for example, the user's input to the contactless smart cards reader. In other embodiments an application running on the personal electronic device may cause intentional termination of a contactless mode session of adapter 10 in order, for example, to enable entering into a contact mode session. Data indicative of the performed transaction may be stored in combi chip 24 and may be sent to the electronic personal device via uP 22 after adapter 10 terminates its contactless communication mode.

Figure 2B:
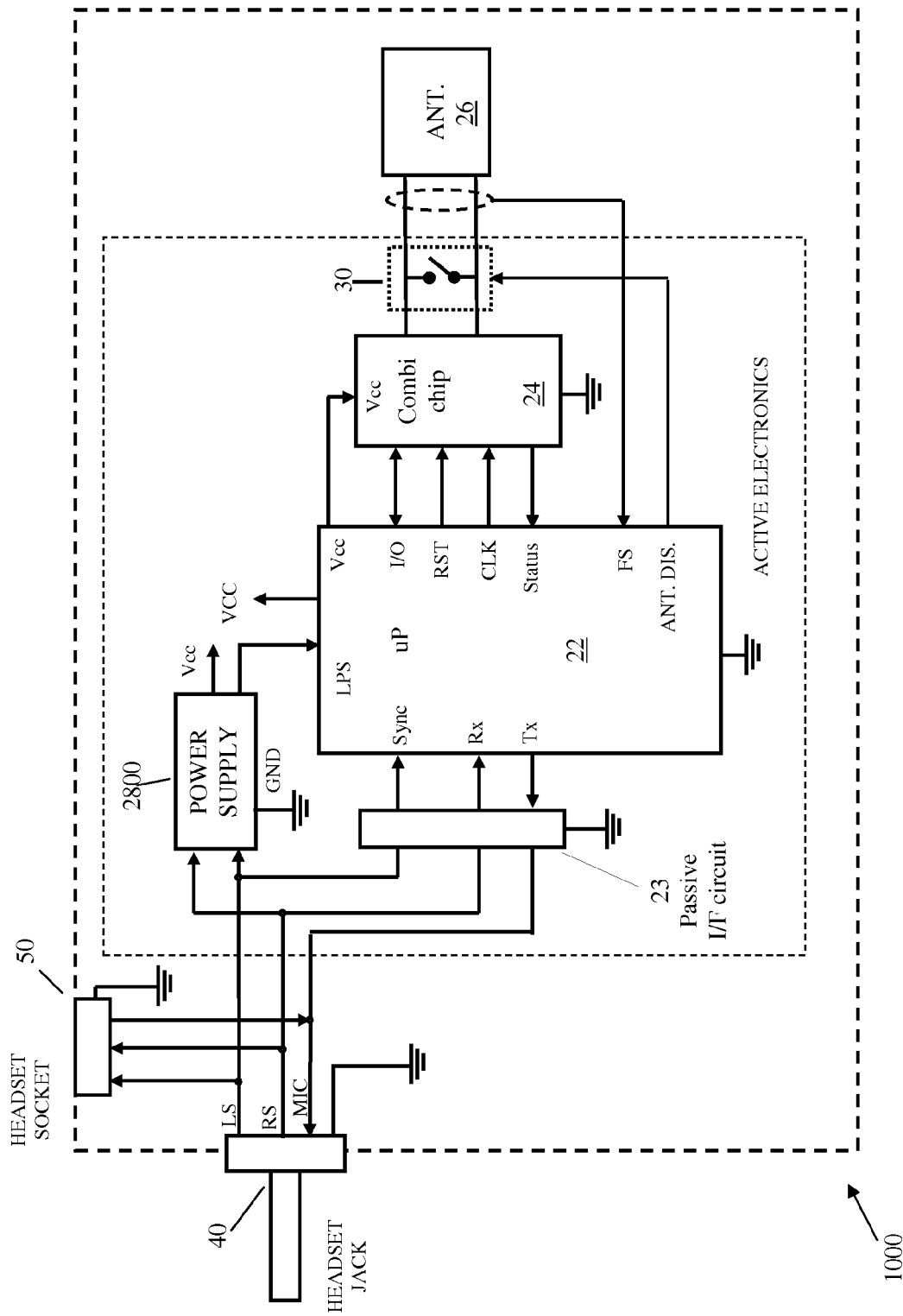
FIG. 2B is a schematic block diagram of an adapter according to embodiments of the present invention.

Reference is made now to FIG. 2B, which is a schematic block diagram of adapter 1000 according to embodiments of the present invention. Adapter 1000 may be very much similar to adapter 10 of FIG. 2A, however it further adds the connection of channel RS to power supply 2800, additional to the connection of channel LS to power supply 2800. Such connection enables higher power to be supplied from a personal electronic device to adapter 10. In such case the energy drive signal at LS and RS channels is typically of opposite phases. Special means may be required to combine the data signal at channel RS together with the energy drive signal. An example for that may be reversing the phase of the energy signal, for example using Manchester coding scheme or similar solutions in this coding category.

Figure 2C:
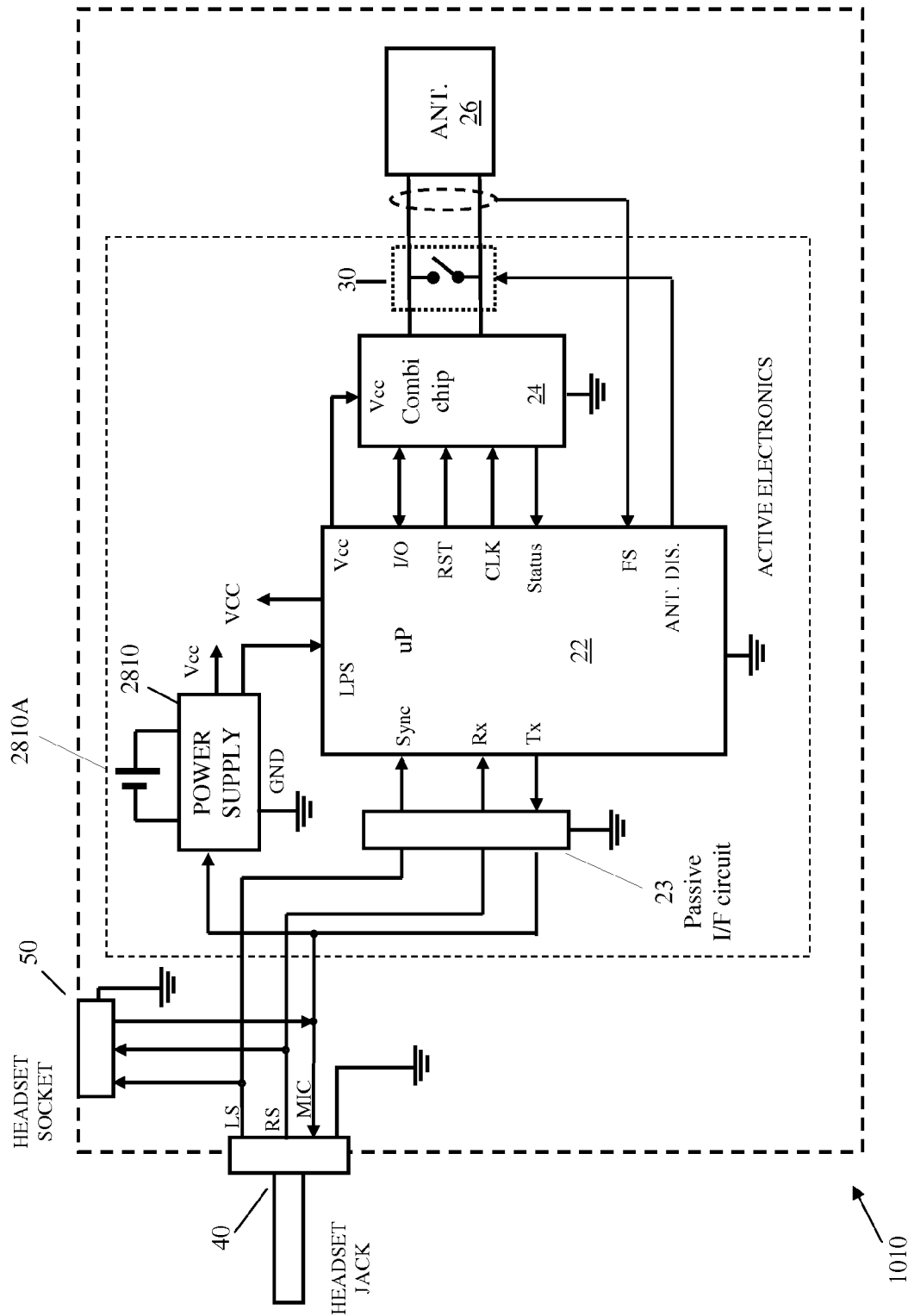
FIG. 2C is a schematic block diagram of an adapter according to embodiments of the present invention.

Reference is made now to FIG. 2C, which is a schematic block diagram of adapter 1010 according to embodiments of the present invention. Adapter 1010 is very much similar to adapter 10 of FIG. 2A, however it uses an on board battery 2810A as a power source for adapter 1010 via power supply unit 2810, instead of the LS signal. In such case the audio channel Mic may be connected to power supply 28 to operate as an activation signal, to activate it only when adapter 1010 is connected to the earphone headset socket of a personal electronic device. The DC voltage present at channel Mic, which is inherently used to otherwise activate an external microphone, may thus be used to perform the activation of power supply 2810. In case of the use of rechargeable battery the DC voltage at channel Mic can also serve to charge battery 2810A. In such case, according to embodiments of the present invention, an external charger may be provided, comprising a socket complying with headset jack 40 to which adapter 1010 can be inserted for overnight charging. LPS signal may indicate the status of the battery voltage to uP 22. This status may be transferred and displayed on the personal electronic device, prompting the user to charge the battery when required.

A super capacitor (not shown) with high enough capacitance may be used instead of a rechargeable battery. In such case appropriate delays should be included in the operating scenario so as to allow long enough charging periods upon start-up and in between transactions. Transaction periods between uP 22 and combi chip 24 should be limited to avoid excessive discharge of super capacitor.

Figure 2D:
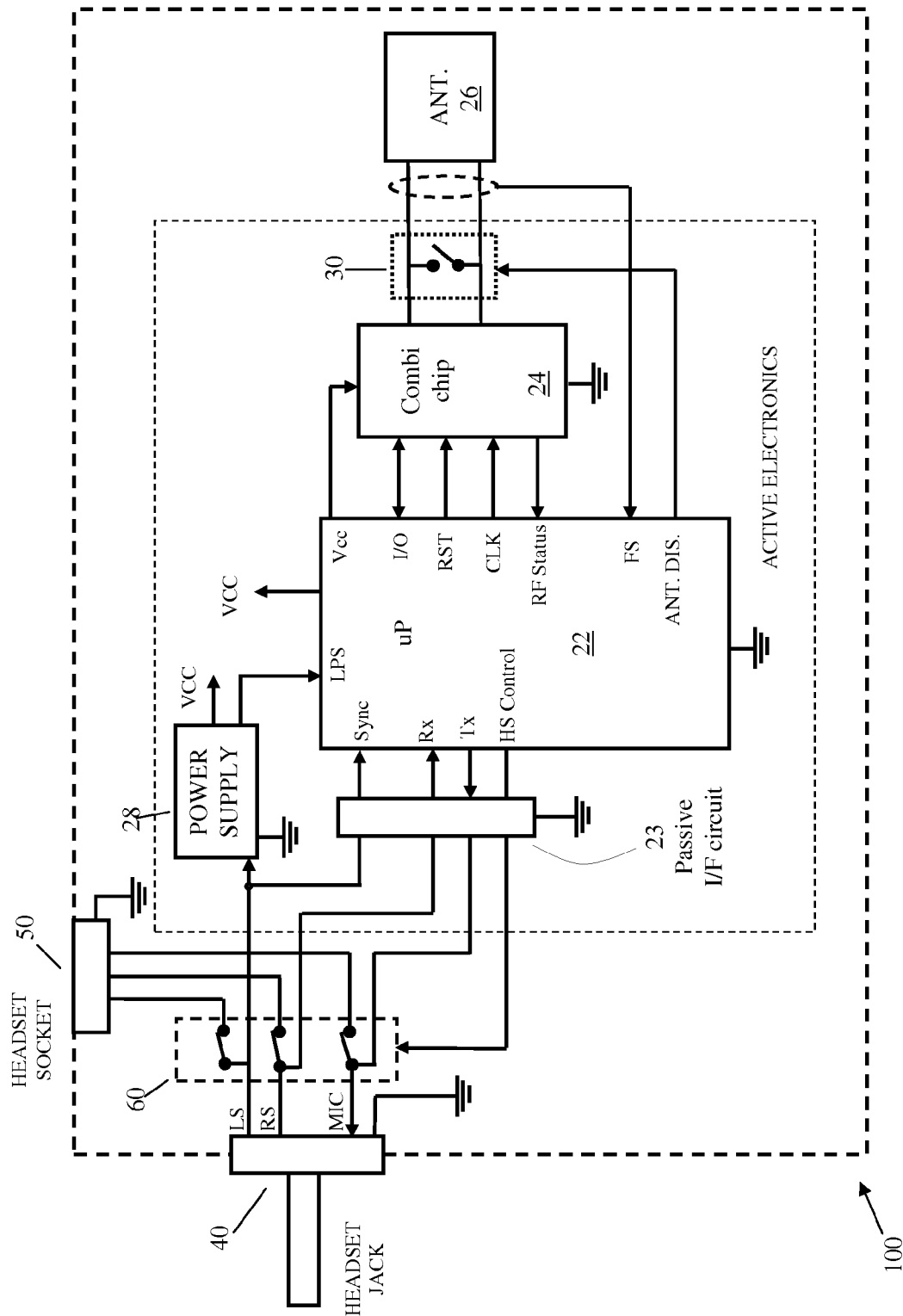
FIG. 2D is a schematic block diagram of another embodiment of an adapter according to embodiments of the present invention.

Reference is made now to FIG. 2D, which is a schematic block diagram of adapter 100 according to embodiments of the present invention. Adapter 100 is very much similar to adapter 10 of FIG. 2A, however it further comprises switch 60 and uP 22 may control it via headset (HS) control signal. Switch 60 may enable connecting/disconnecting of headset socket 50 from the audio channels lines LS, RS and MIC of headset jack 40. When switch 60 is opened headset 50 is disconnected from audio channels LS, RS and MIC. Switch 60 may be realized using electronic switches (transistors or any other controllable connect/disconnect semiconductor means) which may be embodied as discrete units or as part of another unit of adapter 100. Switch 60 may be 'normally closed' so that when adapter 100 is not energized it enables uninterrupted flow of audio signals between headset jack 40 and headset socket 50 and the user of the personal electronic device with adapter 100 may normally listen to audio from the personal electronic device, use the headset as personal speaker set etc.

In cases when lack of power from power supply unit to uP 22 is detected, disconnection of the headset from headset socket 50 may be done automatically by uP 22, without any advance notice to the user of the personal electronic device, by issuance of a signal HS to disconnect headset socket 50 from RS, LS and MIC signals. In yet another embodiments an advance notice may be invoked by uP 22 and be displayed on the personal electronic device screen, leaving it for the user to approve the disconnection or not.

When adapter 100 is in 'off' state and a change to contact communication mode with adapter 100 is required, a powering audio signal as discussed above with respect to FIG. 2A may be transmitted over audio channel LS providing power to uP 22 via power supply unit 28. As part of the operation in this mode control signal HS is issued which changes switch 60 to open state and disconnecting the headset in headset socket 50 from the audio channels. This embodiment eliminates any possible interference by the head set to the operation of the adapter 100. In such embodiment, during certain short time interval, the headset may be still connected to LS line concurrently with power supply unit 28, until uP 22 issues HS control signal. During this time the parallel loading of the LS line by both the head set and the power supply 28 causes less power is available to power supply 28. In order to overcome this situation uP 22 may start operation in an initial stage which requires less power consumption compared to the operation of adapter 10 when other functions are performed by adapter 10, such as powering combi chip 24.

It will be recognized by those skilled in the art that while the embodiments of the present invention described with respect to FIGS. 2A to 2D and FIG. 7 present electronic units 22, 23, 24, 28, 30, 2800, 2810 and 60 as discrete units, some or all of these units may be realized or embodied as parts of a single element and/or on a single chip.

Figure 3A:
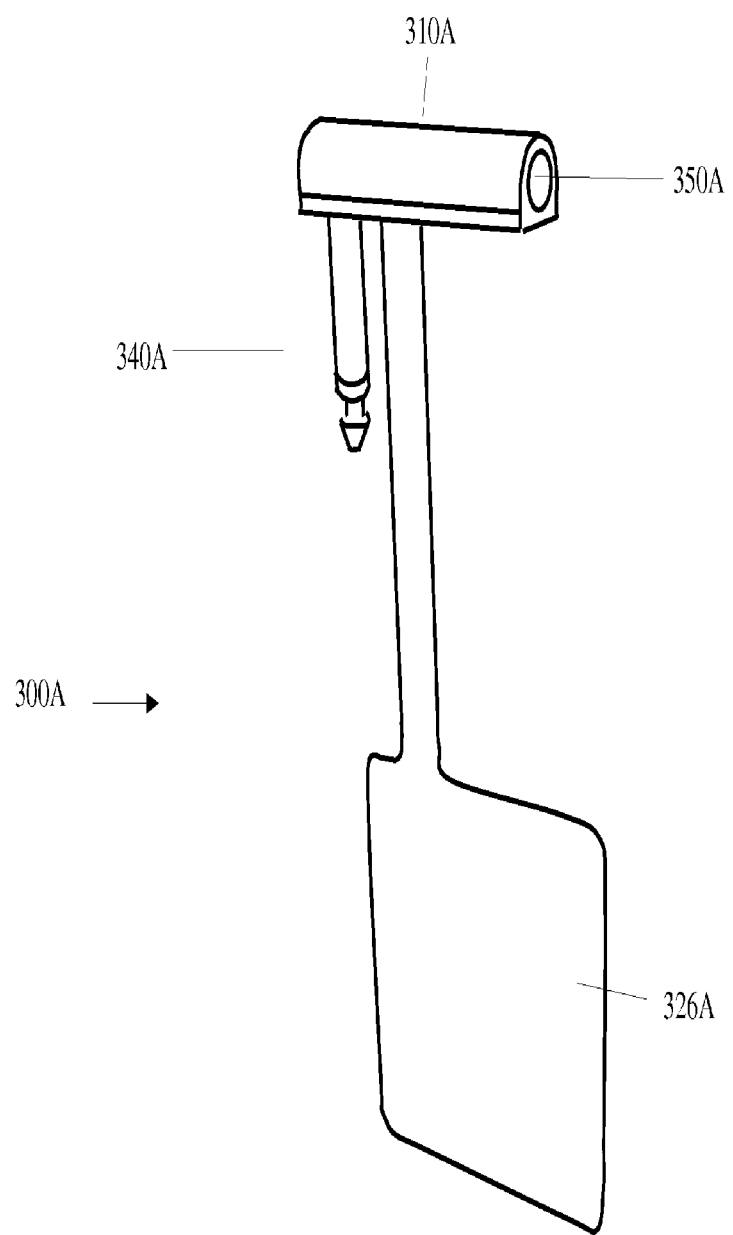
Figure 3C:
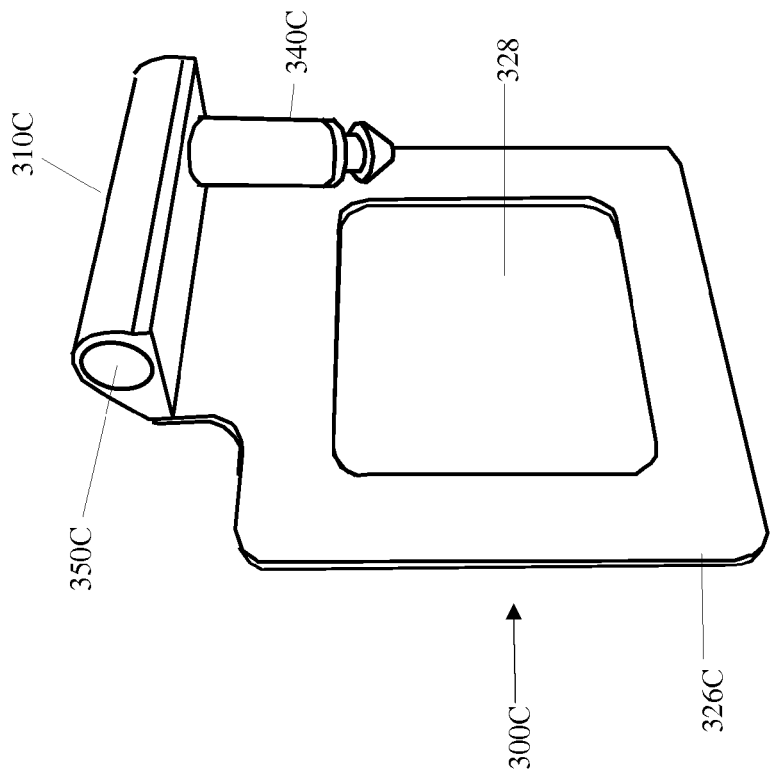

Reference is made now to FIGS. 3A, 3B, 3C, 3D, 3E and 3F which are schematic illustrations of physical designs of adapters 300A, 300B, 300C, 300D, 300E and 300F respectively, according to embodiments of the present invention. Various physical designs of adapters may be required to accommodate different types of personal electronic devices, such as smart phones. FIGS. 3A, 3B and 3C depict designs in which headset/earphone jack 340A, 340B and 340C are electrically and physically connected, respectively, to a casing that contains adapter electronics 310A, 310B and 310C respectively. RF antenna 326A, 326B and 326C are connected, via a flexible connection stripe (FIG. 3A) or via firm connection (FIGS. 3B and 3C), to the respective adapter electronics. Antenna 326B is formed as a flat thin plate and may suit personal electronic devices where in the area of the device's casing adjacent to antenna 326B there is no functionality that requires access to it, while antenna 326C, formed as flat thin square ring having a square cutout 328 in it may suit personal electronic devices where in the area of the device's casing adjacent to cutout 328 there are functionalities, such as a lens of a camera or the like.

A ferrite layer (not shown) may be used as part of the antenna so as to be located between the antenna and the body of the personal electronic device. This ferrite layer is aimed to concentrate the contactless magnetic flux around the antenna so as to reduce its penetration into the personal electronic device where its absorption and/or its associated induced eddy currents causes energy loss and hence reduction of the operating distance of the adapter in contactless mode.

FIG. 3D depicts a physical design 300D in which the RF antenna is enclosed within electronic case 326D.

Figure 3E:
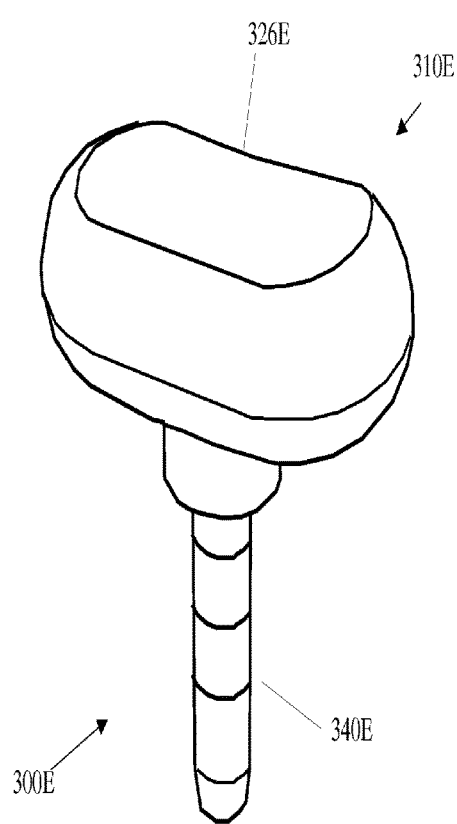

FIG. 3E depicts a physical design 300E in which the RF antenna is enclosed within electronic case 326E and which does not include a headphone socket, such as headset socket 50 (FIG. 2A) and hence allowing a smaller and more compact housing design. Both embodiments, depicted in FIGS. 3D and 3E, may contain ferrite bodies so as to concentrate the contactless magnetic flux in the vicinity of the adapter inside the perimeter of its antennas so as to increase its operating distance in contactless mode.

Figure 3F:
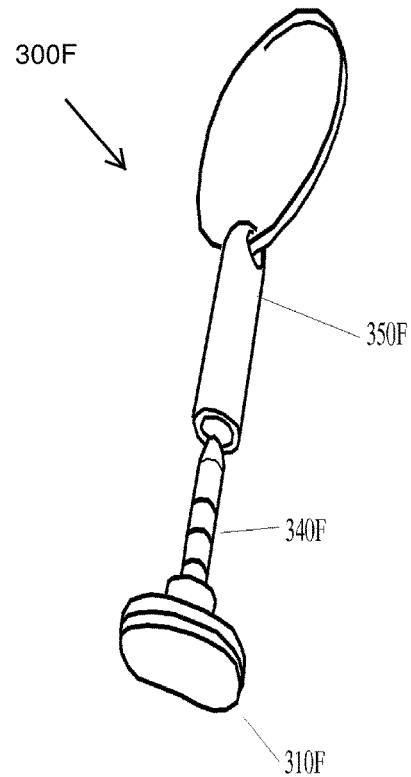

FIG. 3F depicts a key ring adaptor 350F used to hold and keep an adapter, such adapter 300E, (FIG. 3E), when not in use with the personal electronic device.

Various other physical designs may be made, to allow firm adaptation of the RF antenna casing to a specific outer design of the personal electronic device it is designed to work with.

According to some embodiments of the present invention an adapter may comprise a main body adapted to accommodate various designs of RF antennas. Reference is made now to FIG. 4A, schematically illustrates adapter main body 410 according to embodiments of the present invention comprising casing 410A configured to encase the adapter's electronic components, headset plug 410B electrically and mechanically connected to casing 410A and headset socket 410C enclosed within casing 410A. In order to enable firm connection of RF antenna to casing 410A groove 412 may be formed along one longitudinal sides of casing 410A. Groove 412 may have a trapezoid cross section as is shown in magnified partial view 412A of side view of groove 412. It will be apparent to those skilled in the art that the cross section shape of groove 412 may have different shapes, such as a section of a circle and the like.

Figure 4C:
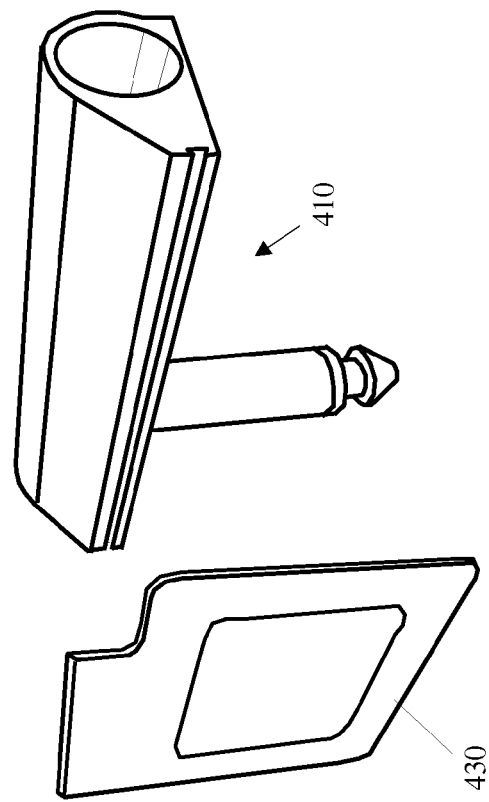

Reference is made now also to FIGS. 4B and 4C which are illustrations of detachable antenna designs 420, 430 respectively adapted according to embodiments of the present, for devices which do not require access to functionalities located adjacent to the RF antenna and for devices which require access to functionalities located adjacent to the RF antenna, respectively. RF antenna 420 may have general mechanical design as RF antenna 326B (FIG. 3B) further equipped with a trapezoid like protrusion 422 made next to one of antenna 420 edges. The cross sectional view of protrusion 422 is seen in magnified view in circle 422A. The shape an sizes of trapezoid-like protrusion 422 may be made to firmly and slidably fit into groove 412 (FIG. 4A) so that when protrusion 422 is inserted into groove 412, for example in a movement depicted by arrow 424 and get inserted fully in antenna 420 will be mechanically attached to casing 410 firmly. In order to provide electrical connections from RF antenna 420 to main body 410 thin plated made of conductive material may be embedded in two locations along protrusion 422, and in two respective locations in groove 412 made so that when RF antenna 420 is properly and fully inserted into groove 412 electrical contact is made between RF antenna 420 and main body 410.

Figure 5:
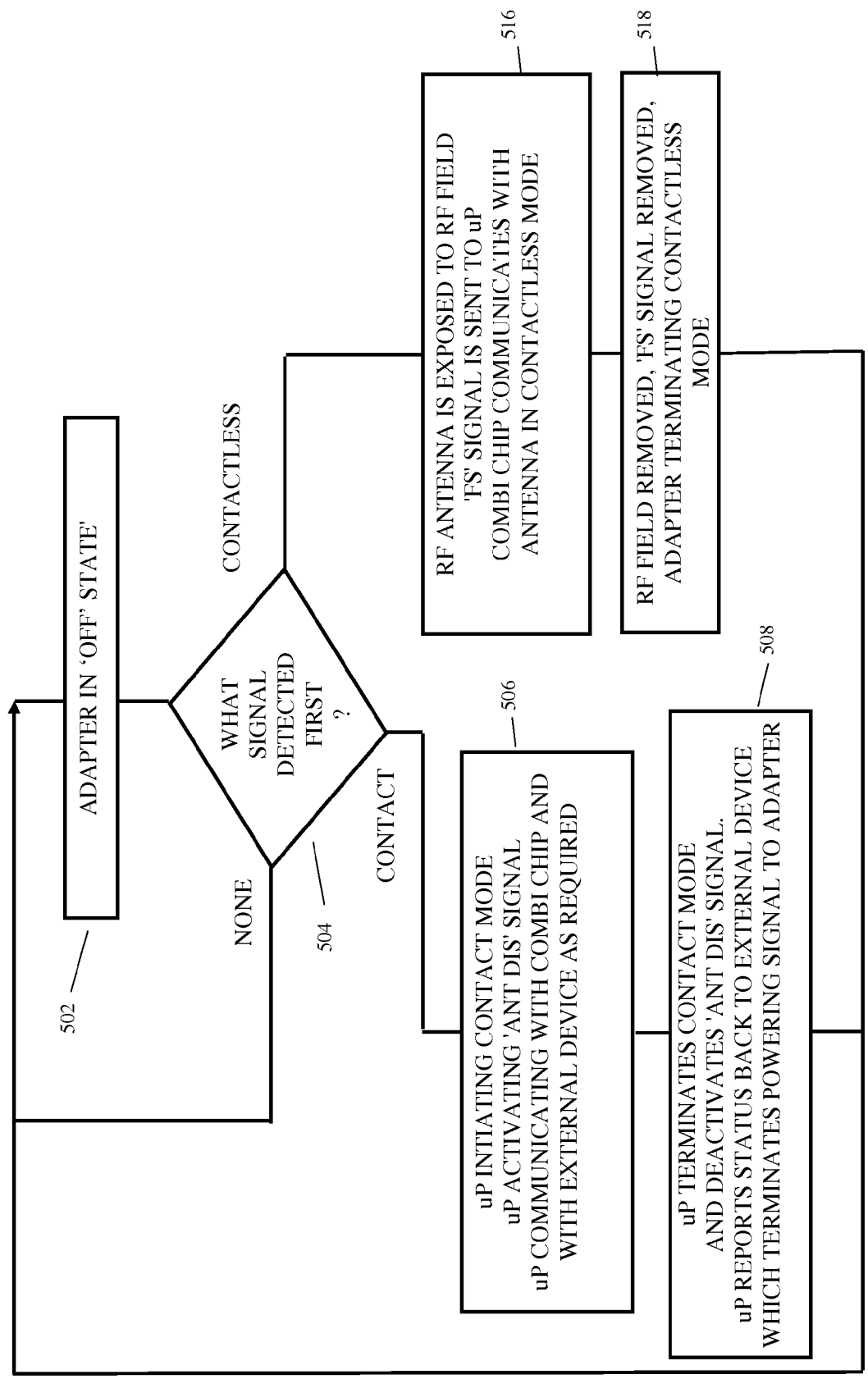
FIG. 5 is a flow diagram depicting method of operation of communication between combi chip, uP and RF antenna comprised in an adapter in the two various modes, according to embodiments of the present invention.

Reference is made now to FIG. 5, which is a flow diagram depicting method of operation of communication between combi chip, such as combi chip 24, uP such as uP 22 and RF antenna such as RF antenna 26 comprised in an adapter, such as adapter 10 in the two various modes, according to embodiments of the present invention. When no communication is performed the adapter is in 'off' state (block 502).

According to the mode of communication initiated first when in 'off' state (if point 504) the communication may enter into contact mode or into contactless mode. If powering signal from the personal electronic device has been received first (CONTACT), the communication is performed in contact mode, ANT DIS signal is activated and the four contact-mode signals (VCC, I/O, Clock and Reset) are also activated (block 506). When this communication terminates the four contact-mode signals (VCC, I/O, Clock and Reset) are deactivated, ANT DIS signal is turned off and sequentially powering signal from external device is removed (block 508). If signal from RF antenna is received first (CONACTLESS) the communication is performed in contactless mode between combi chip and contactless smart card reader via the RF antenna and FS signal is turned on (block 516). When this communication terminates, the RF field is removed and FS signal is turned off (block 518). This mode is terminated when the RF field is removed from the adapter.

Figure 6:
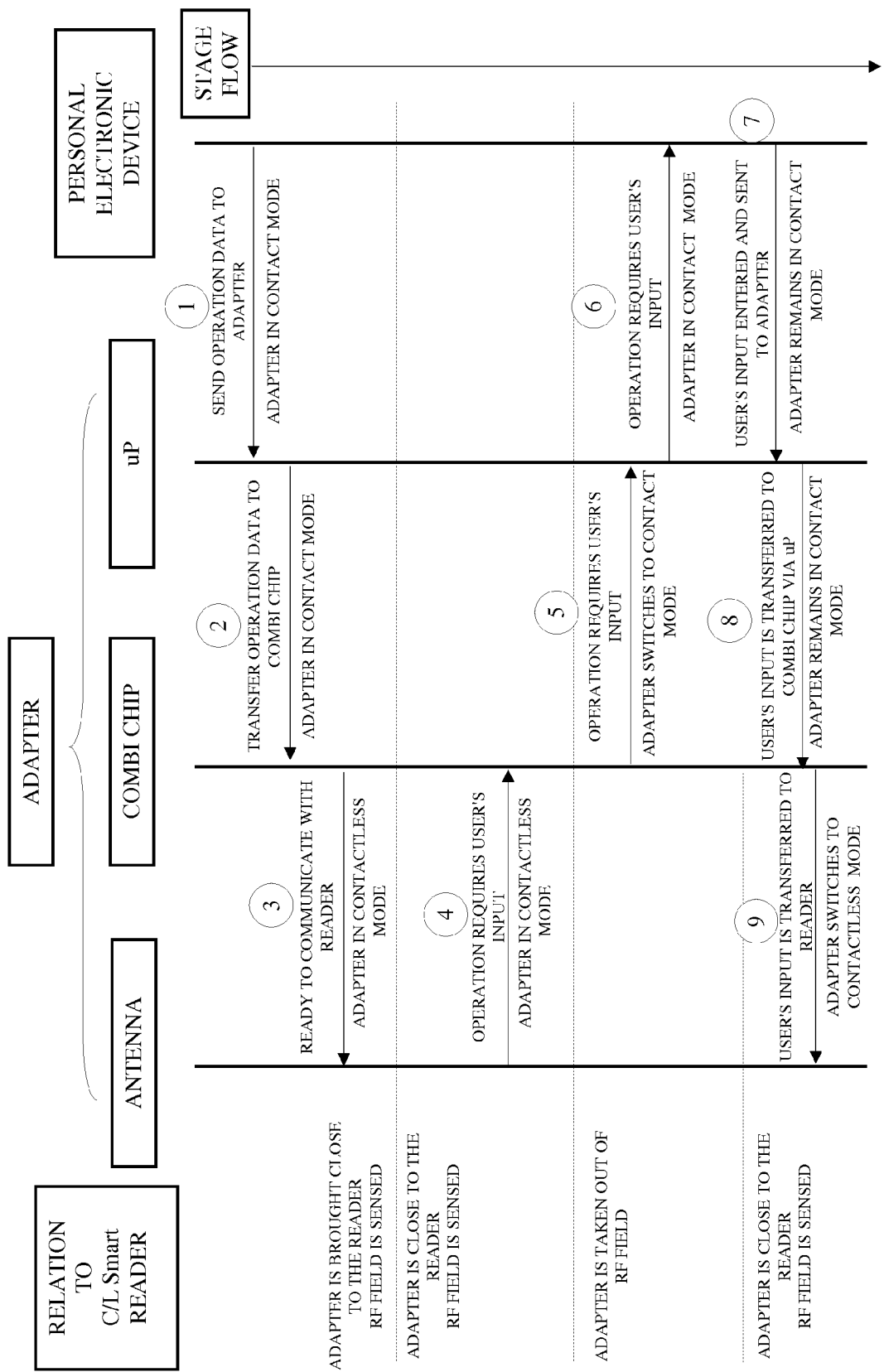
FIG. 6 is a flow diagram depicting stages of operation of an adapter during operation requiring user's input, according to embodiments of the present invention.

Reference is made now to FIG. 6, which is a flow diagram depicting stages of operation of an adapter, such as adapter 10, during operation requiring user's input, according to embodiments of the present invention. When a user of an adapter built and operating according to embodiments of the present invention is used for carrying a transaction, such as payment via a contactless smart card reader, the relevant data may be sent from an application executed in the personal electronic device to the adapter (stage 1). At this stage the adapter is in contact mode thus the operation data is transferred from the uP (such as uP 22) to the combi chip (such as combi chip 24) in contact mode session (stage 2). The adapter may now be brought close to the C/L smart card reader, to a distance enabling contactless mode communication between the adapter and the reader (stage 3). When, as part of the transaction, user's input is required (e.g. confirming the transaction), a request for that input is issued by the C/L smart card reader and transmitted to the adapter (stage 4). The adapter may now be taken out of the RF field of the adapter (this is a natural reaction of a user wishing to get the details of the required input) which in turn enables the adapter to switch to contact mode session (stage 5), to transfer to input request from the combi chip to the uP and from the uP to the personal electronic device (stage 6). In return, when the required response entry is received from the user it is sent by the application, executed on the personal electronic device, to the adapter (stage 7), received by the uP (stage 8) while the adapter is in contact mode session. The adapter now switches to contactless mode session and transfers/transmits the user's input to the contactless smart card reader (stage 9), enabling the completion of the transaction. When the operation has finished the adapter may be taken out of the RF field to terminate the contactless communication mode (not shown).

Figure 7:
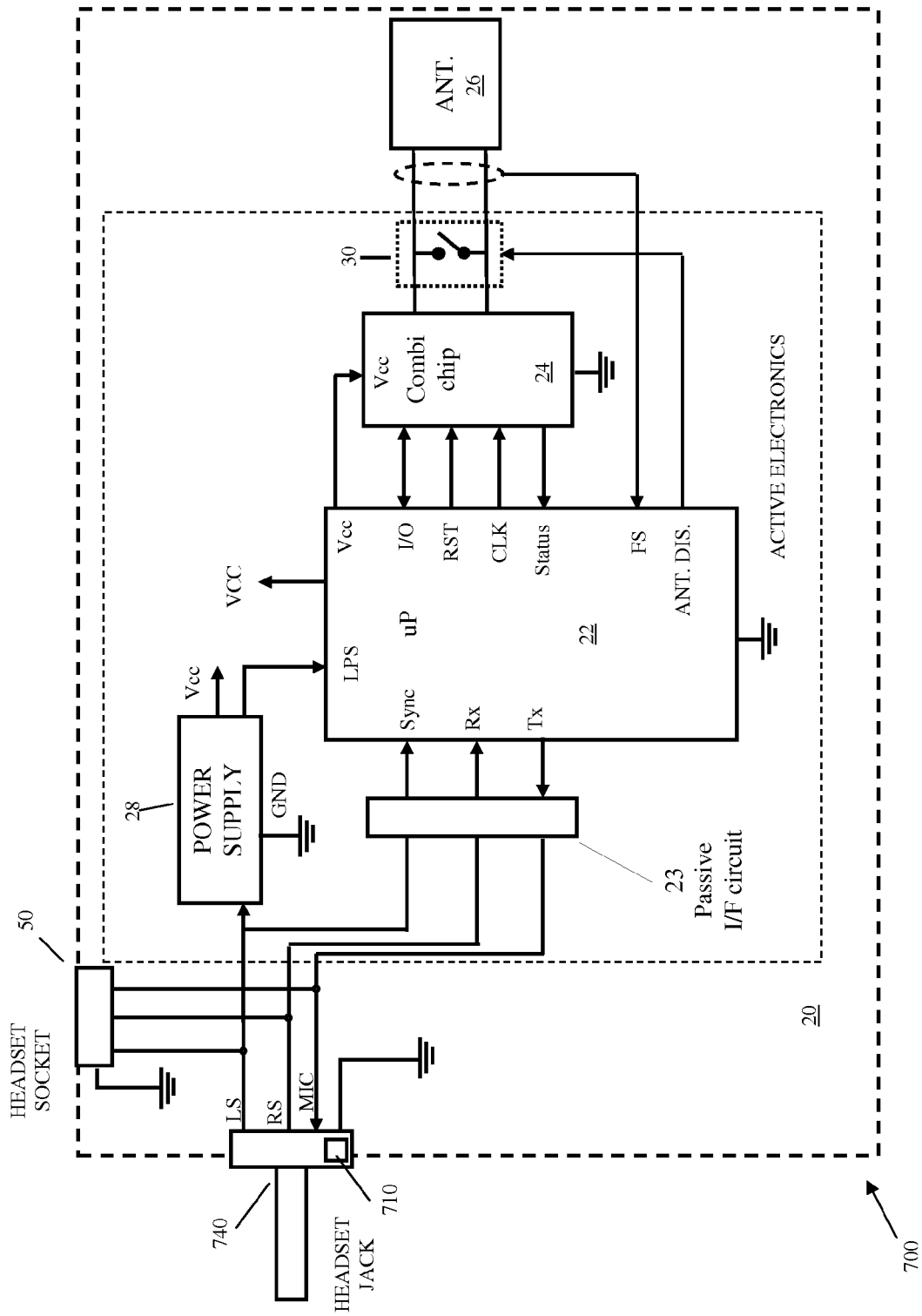
FIG. 7 is a schematic illustration of a modified male plug, according to embodiments of the present invention.

Reference is made now to FIG. 7, which is a schematic block diagram of adapter 700 according to embodiments of the present invention. Adapter 700 is very much similar to adapter 10 of FIG. 2A, however it further comprises a selector 710 to control the audio path. As used herein, audio path may relate to input and output route of audio signals between a user and the personal electronic device. Usually, audio signals may be routed either through the speaker and microphone integrated in the personal electronic device, referred to hereinafter as integrated speaker and microphone, or to a headset via a headset socket of the personal electronic device.

Typically, the headset socket of the personal electronic device includes a micro switch 820 (shown in FIG. 8B) that is mechanically activated-depressed (typically switched open) when headset jack 740 is inserted and deactivated-released (typically switched close) when headset jack 740 is pulled out. Typically, when the personal electronic device senses that there is a headset, the personal electronic device transfers audio through the headset. In this situation, the integrated speaker and microphone are typically disabled, and the user can't use the integrated speaker and microphone.

In system 700 a selector knob 710 may be added and headset jack 740 may be modified to enable controlling the audio path and allow the user to select if system 700 is in 'Phone' state, in which integrated speaker and microphone are not disabled even when headset 740 is inserted into the headset socket of the personal electronic device and audio is transferred via the integrated speaker and microphone, or in 'ADAPTOR' state, in which audio is transferred via the headset socket of the personal electronic device to adaptor 700 and to headset socket 50.

Figure 8B:
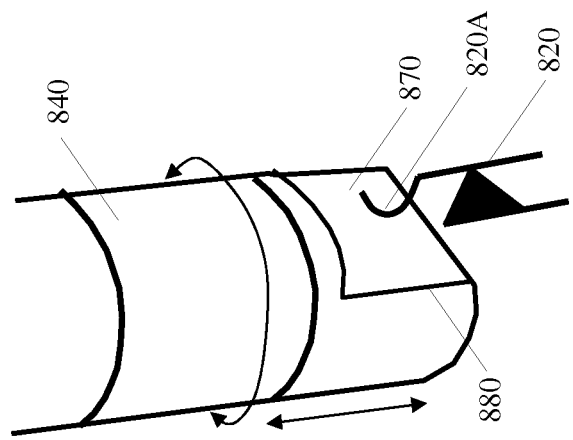
FIG. 8B is an enlarged view of the tip of the modified headset jack depicted in FIG. 8A, according to embodiments of the present invention.
Figure 8A:
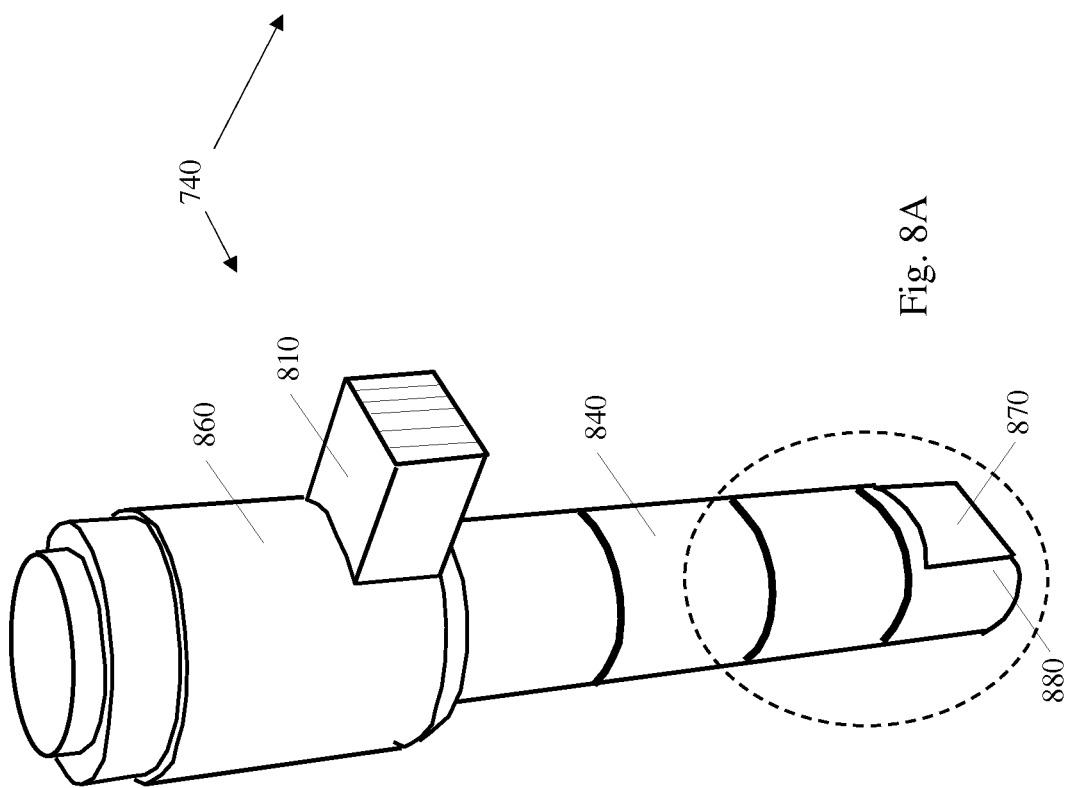
FIG. 8A is a schematic 3D illustration of modified headset jack, according to embodiments of the present invention.

Reference is made now to FIG. 8A which is a schematic 3D illustration of modified headset jack 740, and to FIG. 8B which is an enlarged view of the tip of modified headset jack 740 and of a micro-switch 820 of a headset socket, according to embodiments of the present invention. Modified headset jack 740 includes a recess 870 at the tip of modified headset jack 740, in an area of modified headset jack 740 that corresponds to the location of the activation zone of a micro-switch 820 of a headset socket, when headset jack 740 is inserted into a headset socket at a certain angular position about its longitudinal axis. Recess 870 may be made so to reduce the distance between the outer surface of the distal tip of headset jack 740 from its longitudinal axis in an area that extends a few millimeters from the distal tip towards the proximal end of headset jack 740 and in a range of close to 180 degrees along the perimeter of the distal tip of headset jack 740 (even though a smaller angular range may suffice, depending on the specific design of headset jack 740 and micro-switch 820, such that when modified headset jack 740 is inserted into a headset socket, recess 870 may be located against micro-switch 820 so that micro-switch 820 is not depressed.

Knob 810 may be mechanically coupled with the elongated portion 840 of headset jack 740 and may be used to rotate modified headset jack 740 about its longitudinal axis with respect to adapter 700. When modified headset jack 740 is rotated to an angular position such that recess 870 is located against micro-switch 820, the outer face of modified headset jack 740 is located away from activation tip 820A of micro-switch 820 and therefore micro-switch 820 is deactivated, similar to the status when a jack was not inserted. In this state, audio is transferred via the integrated speaker and microphone, while adaptor 700, by uP 22, may communicate with the personal electronic device connected to modified headset jack 740 through audio channel out RS and audio channel in MIC lines.

When modified headset jack 740 is rotated such that recess 870 is facing away from micro-switch 820, micro-switch 820 is activated; the personal electronic device senses that there is a headset and disconnects all audio output from the integrated speaker and transfers all audio to adapter 700 only.

Side edges 880 of recess 870 may be rounded or otherwise curved to allow smooth rotational movement of modified headset jack 740 between the two modes of operation 'PHONE' and 'ADAPTOR' and smooth activating and deactivating of micro-switch 820.

Figure 9:
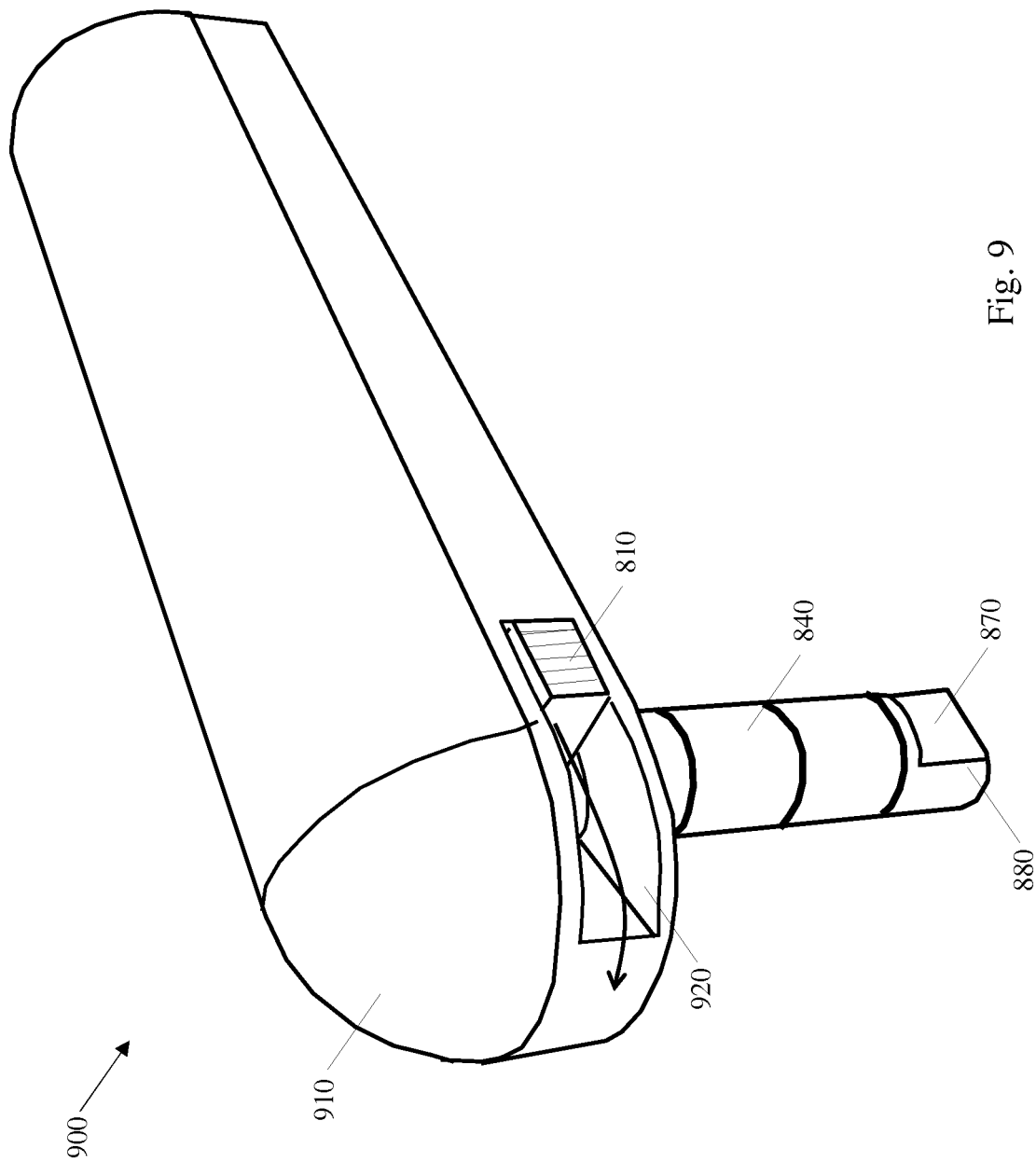
FIG. 9 which is a schematic 3D illustration of the modified headset jack depicted in FIG. 8A, assembled to a casing of an adapter, according to embodiments of the present invention.

Reference is made now to FIG. 9 which is a schematic 3D illustration of modified headset jack 740, assembled to casing 910 of adapter 900, according to embodiments of the present invention. Casing 910 may contain electronics of adapter 900. Casing 900 may include a curved window 920. Knob 810 may be movable within window 920 in an angular path. Window 920 may limit the range of motion of knob 810 and the rotation angle of modified headset jack 740 at a range of, for example, 20-40 degrees, as may be required for activating and deactivating micro-switch 820. Window 710 may be designed so that rotating modified headset jack 740 all the way to a first direction activates micro-switch 820, while rotating modified headset jack 740 all the way to a second direction deactivates micro-switch 820.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device for enabling a personal electronic device to communicate with a contactless smart card reader, the device comprising:
    an adapter comprising:
        a processor;
        a combination contact and contactless smartcard chip; and
        an antenna,
        wherein said processor is configured to communicate data modulated on an audio channel with said personal electronic device, and wherein communication with said combination contact and contactless smartcard chip switches back and forth between a contact mode of operation for communicating with said processor using contact communication and a contactless mode of operation for communicating with said contactless smart card reader via said antenna using contactless communication, avoiding concurrently communicating with said combination contact and contactless smartcard chip in both the contact and contactless modes of operation when an attempt is made for said concurrent communication.

2. The device of claim 1, wherein the adapter further comprises: an audio jack configured to receive at least one audio signal modulated on at least one audio channel via an audio socket of said personal electronic device.

3. The device of claim 2, wherein said at least one audio signal modulated on said at least one audio channel is modulated as at least one speaker audio signal of said at least one speaker audio channel.

4. The device of claim 3, wherein the adapter further comprises a power supply unit.

5. The device of claim 4, wherein the adapter further comprises:
    a battery connected to said power supply unit to provide electrical energy to said power supply unit.

6. The device of claim 4, wherein the adapter further comprises:
    a rechargeable battery connected to said power supply unit to provide electrical energy to said power supply unit.

7. The device of claim 6 wherein said power supply is configured to charge the rechargeable battery by power received via one or more of said at least one audio signal.

8. The device of claim 4, wherein the adapter further comprises:
    a super capacitor connected to said power supply unit to provide electrical energy to said power supply unit.

9. The device of claim 8 wherein said power supply is configured to charge the super capacitor by power received via one or more of said at least one audio channel.

10. The device of claim 4 wherein said power supply unit provides a signal to said processor indicating low power when the power available from said power supply unit is lower than a predefined level.

11. The device of claim 3, wherein the adapter further comprises:
    an interface circuit to connect and adapt one or more of said at least one audio signal to said processor.

12. The device of claim 3, wherein the adapter further comprises:
    a headset socket to connect said at least one audio signal to an audio device connected to said headset socket.

13. The device of claim 12, wherein the adapter further comprises:
    a switch controllable by said processor to enable electrical disconnection of said at least one audio signal from said headset socket.

14. The device of claim 1, wherein said antenna is configured to provide a signal to said processor indicative that a radio frequency (RF) field of magnitude higher than a predefined level is sensed at said antenna.

15. The device of claim 1, wherein the adapter comprises an antenna control unit, controlled by said processor, configured to enable the flow of radio frequency (RF) signals between the combination contact and contactless smartcard chip and the antenna in the contactless mode of operation and to disable the flow of RF signals between the combination contact and contactless smartcard chip and the antenna in the contact mode of operation.

16. The device of claim 15, wherein the antenna control unit is an electronic switch which is open to enable the antenna to connect to the combination contact and contactless smartcard chip in the contactless mode of operation and which is closed to short the antenna connection in the contact mode of operation.

17. The device of claim 16, wherein the electronic switch is normally open so that the adapter is normally in the contactless mode of operation.

18. The device of claim 15, wherein the processor issues one or more antenna disable commands to the antenna control unit to disable the antenna connection to the combination contact and contactless smartcard chip to allow the combination contact and contactless smartcard chip to communicate in the contact mode of operation.

19. The device of claim 15, wherein the processor forces the combination contact and contactless smartcard chip to switch to the contact mode of operation regardless of a radio frequency (RF) field sensed by the antenna by controlling the antenna control unit to disable the flow of RF signals between the combination contact and contactless smartcard chip and the antenna.

20. The device of claim 1, wherein communication with the combination contact and contactless smartcard chip switches to the contactless mode of operation when the antenna senses an above threshold radio frequency (RF) field.

21. The device of claim 20, wherein communication with the combination contact and contactless smartcard chip switches to the contact mode of operation when the antenna senses a below threshold radio frequency (RF) field.

22. The device of claim 20, wherein the processor forces the combination contact and contactless smartcard chip to switch to the contact mode of operation regardless of the radio frequency (RF) field sensed by the antenna.

23. A method for enabling a personal electronic device to communicate with a contactless smart card reader, the method comprising:
communicating, between said personal electronic device and a processor in an adapter, data modulated on an audio channel; and
communicating at a combination contact and contactless smartcard chip in said adapter, wherein the combination contact and contactless smartcard chip switches back and forth between a contact communication mode of operation for said combination contact and contactless smartcard chip to communicate with said processor using contact communication and a contactless communication mode of operation for said combination contact and contactless smartcard chip to communicate with said contactless smart card reader via an antenna in said adapter using contactless communication, avoiding concurrent communication of said combination contact and contactless smartcard chip in both the contact and contactless communication modes of operation when an attempt is made for said concurrent communication.

24. The method of claim 23 further comprising receiving a signal from said antenna indicative that a radio frequency (RF) field of magnitude higher than a predefined level is sensed at said antenna.

25. The method of claim 23 further comprising controlling a switch for electrically connecting the antenna to the combination contact and contactless smartcard chip to switch to the contactless mode of operation and disconnecting the antenna to the combination contact and contactless smartcard chip to switch to the contact mode of operation.

26. The method of claim 23 further comprising:
disabling the flow of radio frequency (RF) signals between the combination contact and contactless smartcard chip and said antenna in the contact mode of operation in response to a control signal from said processor.

27. The method of claim 23 further comprising:
recharging a rechargeable battery connected to a power supply unit in said adapter by power received via said audio channel.

28. A device for enabling a personal electronic device to communicate with a contactless smart card reader, the device comprising:
an adapter comprising:
a processor;
a combination contact and contactless smartcard chip;
an antenna; and
an antenna signal enable and disable unit,
wherein said processor communicates data modulated on an audio channel with said personal electronic device,
and wherein said antenna signal enable and disable unit switches back and forth between a contact mode of operation by disabling an antenna signal for said combination contact and contactless smartcard chip to communicate with said processor using contact communication and a contactless mode of operation by enabling an antenna signal for said contactless smart card reader to communicate with said contactless smart card reader via said antenna, avoiding concurrent communication of said combination contact and contactless smartcard chip in both the contact and contactless communication modes of operation when an attempt is made for said concurrent communication.

* * * * *